US011706052B2

(12) United States Patent
Singh et al.

(10) Patent No.: US 11,706,052 B2
(45) Date of Patent: *Jul. 18, 2023

(54) SMART CONTROL APPARATUS, SYSTEM, METHOD, AND COMPUTER-READABLE RECORDING MEDIA FOR A WIRELESS NETWORK

(71) Applicant: ARRIS Enterprises LLC, Suwanee, GA (US)

(72) Inventors: Virendra Singh, Karnataka (IN); Ravi Chandra Gaddam, Telangana (IN); George Gnana Jeyaraj, Karnataka (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,787

(22) Filed: Jun. 24, 2022

(65) Prior Publication Data
US 2022/0329460 A1 Oct. 13, 2022

Related U.S. Application Data

(63) Continuation of application No. 17/137,974, filed on Dec. 30, 2020, now Pat. No. 11,405,239.
(Continued)

(51) Int. Cl.
H04W 4/00 (2018.01)
H04L 12/46 (2006.01)
(Continued)

(52) U.S. Cl.
CPC ......... H04L 12/4675 (2013.01); H04W 24/02 (2013.01); H04W 48/16 (2013.01);
(Continued)

(58) Field of Classification Search
CPC .. H04L 12/4675; H04W 24/02; H04W 48/12; H04W 48/16; H04W 48/18; H04W 88/08
(Continued)

(56) References Cited

U.S. PATENT DOCUMENTS 7,606,260 B2  10/2009  Oguchi et al.
7,835,301 B1  11/2010  Maufer
(Continued)

FOREIGN PATENT DOCUMENTS

WO    2013/174672    11/2013

OTHER PUBLICATIONS

International Preliminary Report on Patentability dated Jul. 5, 2022 in International (PCT) Application No. PCT/US2020/067445.
(Continued)

Primary Examiner — Temica M Beamer
(74) Attorney, Agent, or Firm — Wenderoth, Lind & Ponack, L.L.P.

(57) ABSTRACT

An apparatus, system, method, and computer-readable recording media perform smart control in a wireless network, which includes a plurality of wireless devices. Configuration parameters are obtained to set one wireless device as an active master device in the wireless network. The active master device receives updates in the configuration parameters and learned station (STA) information, and periodically transmits the updates to the configuration parameters and the learned STA information to the other wireless devices in the wireless network. Any one of the other wireless devices in the wireless network can use the updates to the configuration parameters and the learned STA information to be set as a new active master device in the wireless network when the active master device becomes out of network.

20 Claims, 4 Drawing Sheets

Related U.S. Application Data

(60) Provisional application No. 62/956,812, filed on Jan. 3, 2020.

(51) Int. Cl.
  *H04W 24/02* (2009.01)
  *H04W 48/16* (2009.01)
  *H04W 84/12* (2009.01)
  *H04W 84/18* (2009.01)
  *H04W 88/08* (2009.01)

(52) U.S. Cl.
  CPC ......... *H04W 84/12* (2013.01); *H04W 84/18* (2013.01); *H04W 88/08* (2013.01)

(58) Field of Classification Search
  USPC ........................................ 370/338
  See application file for complete search history.

(56) References Cited

U.S. PATENT DOCUMENTS

| | | |
|---|---|---|
| 2007/0064673 A1 | 3/2007 | Bhandaru et al. |
| 2016/0295628 A1 | 10/2016 | Allanki et al. |
| 2020/0280481 A1 | 9/2020 | Fea |
| 2021/0059001 A1 | 2/2021 | Boccon-Gibod |
| 2021/0204319 A1 | 7/2021 | Sugaya |

OTHER PUBLICATIONS

Notification of Transmittal of the International Search Report and the Written Opinion of the International Searching Authority, dated Apr. 8, 2021 in International (PCT) Application No. PCT/US2020/067445.

SMART CONTROL APPARATUS, SYSTEM, METHOD, AND COMPUTER-READABLE RECORDING MEDIA FOR A WIRELESS NETWORK

TECHNICAL FIELD

The subject matter of the present disclosure relates generally to the implementing of smart control devices in a wireless network such as a mesh network.

BACKGROUND

There has been a rapid rise in the use of wireless devices in wireless networks, which has increased traffic drastically, degraded the quality of service, and reduced the coverage capabilities of many network devices (e.g., residential gateways). The wireless industry recognized these issues and developed standards for wireless routing protocols such as a mesh access point (MAP) protocol, which allows for wireless devices including wireless access point (APs) to communicate with each other using optimal paths for relaying data in a wireless network. The MAP protocol is a wireless certified alliance (WFA) specification to enable interoperability across wireless APs from different vendors in a wireless network. The MAP protocol defines the control protocols between wireless APs as well as the data objects necessary to enable onboarding, provisioning, control, and management of wireless devices in a wireless network.

A wireless network implementing the MAP protocol (e.g., MAP network) generally includes one MAP controller (MAPC) device (e.g., master device) and one or more MAP agent (MAPA) devices. Typically, a user or operator configures the MAPC device using various configuration parameters. Additionally, the MAPC device obtains learned station (STA) information (e.g., band capability, steering friendly devices, etc.) from other wireless devices (e.g., APs, gateways, or extenders) in the wireless network. However, problems can arise in the control of the wireless network when the active MAPC device becomes out of network.

In this situation, no other MAPA device is able to assume the role of the active MAPC device because the configuration parameters and learned STA information remain with the active MAPC device, which is now out of network. Current MAP protocols have no solution to address this problem. Accordingly, the user or operator is required to reconfigure another wireless device (e.g., an MAPA device) to be the new active master device. However, because the learned STA information is lost, it can affect the steering algorithms implemented and the overall steering operations in the wireless network. Additionally, the new active master device is required to obtained learned STA information by associated with the other MAPA devices in the wireless network, which can affect overall system performance.

Thus, it would be advantageous and an improvement over the relevant technology to provide a smart control apparatus, system, method, and program that is capable providing seamless control in a wireless network when an active MAPC device suddenly becomes out of network, such that overall system performance remains unaffected.

SUMMARY

An embodiment of the present disclosure provides a method for implementing smart control in a wireless network. The method includes obtaining, using one wireless device, configuration parameters to set the one wireless device as an active master device in the wireless network, and storing the configuration parameters and learned station (STA) information. Upon receiving updates in the configuration parameters and learned STA information, the active master device periodically transmits the updates to the configuration parameters and the learned STA information to the other wireless devices in the wireless network. The other wireless devices store the updates to the configuration parameters and learned STA information. Any one of the other wireless devices in the wireless network uses the updates to the configuration parameters and the learned STA information to be set as a new active master device in the wireless network when the active master device becomes out of network.

In a method according to an embodiment of the present disclosure, messages are transmitted periodically between the plurality of wireless devices, and the new active master device is determined based on the messages received between the plurality of wireless devices or based on messages being missed or not sent by the active master device. The messages include information regarding networking capabilities of each of the plurality of wireless devices to be the new active master device.

In a method according to an embodiment of the present disclosure, the active master device creates a configuration database in a memory, periodically transmits a request for a message or a notification exchange with the other wireless devices in the wireless network, performs updates to the configuration database, and transmits the database changes and updates to the other wireless devices in the wireless network. The other wireless devices in the wireless network store the database changes and updates in respective memories.

An embodiment described in the present disclosure provides a system for implementing smart control in a wireless network that includes a plurality of wireless devices. Each wireless device includes a user interface, at least one hardware processor, a non-transitory memory storing a program, and a network interface configured to establish connections in the wireless network.

Each of the plurality of wireless devices executes their respective programs using their respective hardware processors to obtain, using the user interface of one wireless device, configuration parameters to set the one wireless device as an active master device in the wireless network, and store the configuration parameters and the learned station (STA) information in a memory.

The active master devices receives using the network interface, updates in the configuration parameters and learned STA information, and periodically transmits using the network interface the updates to the configuration parameters and the learned STA information to the other wireless devices in the wireless network. Any one of the other wireless devices in the wireless network uses the updates to the configuration parameters and the learned STA information to be set a new active master device in the wireless network when the active master device becomes out of network.

The wireless network may be a mesh network, the active master device may be a mesh access point (MAP) control device, and the other wireless devices may be MAP agent devices. The configuration parameters include radio resource management (RRM) configuration data and basic service set (BSS) configuration data, and the learned STA information includes band capacity and band steering information. At least one of the other wireless devices can be a cloud-based wireless device, and each of the plurality of wireless devices includes any one of a wireless access point, a wireless gateway, and a wireless extender.

An embodiment described in the present disclosure provides a smart control apparatus for implementing smart control in a wireless network that includes a user interface, at least one hardware processor, a non-transitory memory storing a program, and a network interface configured to establish connections in the wireless network. The least one hardware processor executes the program to obtain, through the user interface, configuration parameters to set the smart control apparatus as an active master device in the wireless network, and store, in the non-transitory memory, the configuration parameters and learned station (STA) information. The smart control device receives, through the network interface, updates in the configuration parameters and learned STA information, and periodically transmits, using the network interface, the updates to the configuration parameters and the learned STA information to other wireless devices in the wireless network. Any one of the other wireless devices in the wireless network uses the updates to the configuration parameters and the learned STA information to be set as a new active master device in the wireless network when the active master device becomes out of network.

An embodiment described in the present disclosure provides a smart control apparatus that obtains periodically, through a network interface, configuration parameters and learned station (STA) from an active master device in the wireless network; stores, in a non-transitory memory, the configuration parameters and learned station (STA) information; and sets, using the hardware processor, the smart control apparatus as a new active master device when the active master device becomes out of network.

An embodiment described in the present disclosure provides a non-transitory computer-readable recording medium in each of a plurality of wireless devices for implementing smart control in a wireless network, each non-transitory computer-readable recording medium storing one or more programs which when executed by a respective hardware processor perform the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
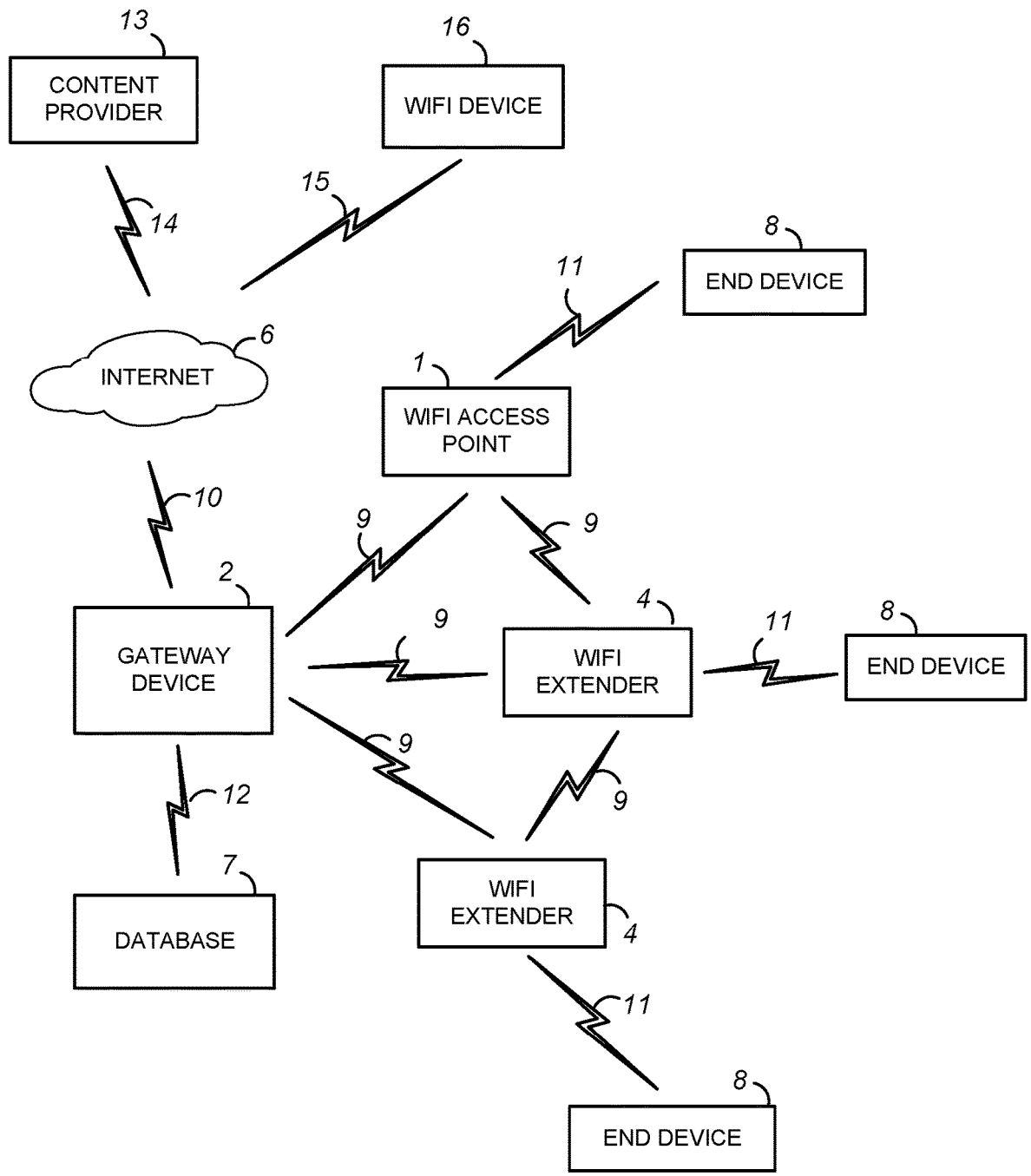
FIG. 1 is a schematic diagram of a system for implementing smart control in a wireless network according to an embodiment of the present disclosure.

FIG. 1 is a schematic diagram of a system for implementing smart control in a wireless network according to an embodiment of the present disclosure. As shown in FIG. 1, the system includes a wireless network in which a gateway device 2 is connected to one or more wireless devices including a wireless access point (AP) 1 and wireless extenders 4 for providing services and/or content from a content provider 13 to one or more end devices 8. It is comtemplated by the present disclosure that the wireless network can be a residential mesh network operating as a local area network (LAN), wireless local area network, or virtual local area network (VLAN), which can also be connected to one or more cloud-based devices including another wireless device 16 via the Internet 6.

The gateway device 2 is a wireless electronic device that routes content and messages received from, for example, the content provider 13 to other devices in the wireless network (e.g., AP 1, wireless extenders 4, and end devices 8). The gateway device 2 can also be implemented to allow wireless devices to use and shared data in the wireless network. The gateway device 2 may have multiple uses such as, for example, allocating bandwidth, providing firewalls and other hosting functions.

The connections 10 between the gateway device 2 and the Internet 6 can be implemented using a DSL connection, a cable modem, a broadband mobile phone network, or other similar connections. Additionally, the connection 10 may be implemented using a wireless connection that operates in accordance with, but is not limited to, IEEE 802.11 protocol, a Radio Frequency For Consumer Electronics (RF4CE) protocol, ZigBee protocol, Z-Wave protocol, or IEEE 802.15.4 protocol. It is also contemplated by the present disclosure that the gateway device 2 is capable of providing connections between the wireless network and a wide area network (WAN), a local area network (LAN), a virtual private network (VPN), metropolitan area networks (MANs), personal area networks (PANs), and wireless local area networks (WLANs), system area networks (SANs), a public switched telephone network (PTSA), a global Telex network, or a 2G, 3G, 4G or 5G network using connection 10.

The connection 14 between the Internet 6 and the content provider 13 can be implemented using a WAN, LAN, VPN, MANs, PANs, WLANs, SANs, a PTSA, a global Telex network, or a 2G, 3G, 4G or 5G network. The content provider 13 may be a cable television provider, a satellite television provider, an internet service provider, or multiple system operators. As shown in FIG. 1, the gateway device 2 also routes data and messages to and from the AP 1 and the wireless extenders 4 in the wireless network using connections 9. The connections 9 between the gateway device 2 and the wireless extenders 4 and AP 1, and between the wireless extenders 4 and the AP 1 are implemented using a wireless connection that operates in accordance with, but is not limited to, IEEE 802.11 protocol, RF4CE protocol, ZigBee protocol, Z-Wave protocol, or IEEE 802.15.4 protocol.

The AP 1 is a wireless electronic device that transmits and receives data and serves as an interconnection point in the wireless network. The AP 1 may also provide data and messages received from the gateway device 2 to an end device 8. The wireless extenders 4 are hardware electronic devices that are used to extend the wireless network by receiving the signals transmitted by the gateway device 2 and rebroadcasting the signals to the end devices 8, which may be out of range of the gateway device 2. The wireless extenders 3 also receive signals from the end devices 8 and rebroadcast the signals to the gateway device 2.

The connections 11 between the wireless extenders 4 and the end devices 8, and between the AP 1 and the end devices 8 are implemented through a wireless connection that operates in accordance with, but is not limited to, IEEE 802.11 protocol, RF4CE protocol, ZigBee protocol, Z-Wave protocol, or IEEE 802.15.4 protocol. The connection 11 can also be a wireless connection that operates in accordance with a Bluetooth protocol or other short range protocols that operate in accordance with a wireless technology standard for exchanging data over short distances using short-wavelength Ultra high frequency (UHF) radio waves from 2.4 to 2.485 GHz.

The end devices 8 are, for example, client devices that include, but are not limited to, a computer, a portable device, an electronic tablet, a smart phone, smart speakers, or other wireless hand-held consumer electronic device capable of executing and displaying the content received through the gateway device 2 and the wireless extenders 4. As shown in FIG. 1, the gateway device 2 is also connected to a database 7. The database 7 can be used to store various network information, wireless device information, configuration parameters, and learned station (STA) information. The database 7 can be located in the wireless network or in a separate network connected to the wireless network such as a WAN, LAN, VPN, MANs, PANs, WLANs, SANs, a PTSA, a global Telex network, or a 2G, 3G, 4G or 5G network. Although the database 7 is shown in FIG. 1 as a separate device, the database 7 can be one or more memories or memory locations in any one of the wireless devices such as the gateway device 2, the AP 1, or the wireless extenders 4 in the wireless network.

The connections 12 between the gateway device 2 and database 7 can be implemented using a DSL connection, a cable modem, a broadband mobile phone network, or other similar connections. The connection 12 may also be implemented using a wireless connection that operates in accordance with, but is not limited to, IEEE 802.11 protocol, RF4CE protocol, ZigBee protocol, Z-Wave protocol, or IEEE 802.15.4 protocol. Additionally, it is contemplated by the present disclosure that the connection 12 may be capable of providing connections between the wireless network and a WAN, LAN, VPN, MANs, PANs, WLANs, SANs, a PTSA, a global Telex network, or a 2G, 3G, 4G or 5G network.

As shown in FIG. 1, the gateway device 2 can also be connected to other cloud-based devices such another wireless device 16 via the Internet 6. The wireless device 16 may have similar structure and networking capabilities of any one of the gateway device 2, the AP 1, and the wireless extender 4 in the wireless network. The connection 15 between the Internet 6 and the wireless device 16 can be implemented using a WAN, LAN, VPN, MANs, PANs, WLANs, SANs, a PTSA, a global Telex network, or a 2G, 3G, 4G or 5G network. Although FIG. 1 only shows one gateway device 2, one AP 1, two wireless extenders 4, and one cloud-based wireless device 16, it is contemplated by the present disclosure that there could be any number of gateway devices 2, APs 1, and wireless extenders 4, and wireless devices 16 implemented in or with the wireless network.

Figure 2:
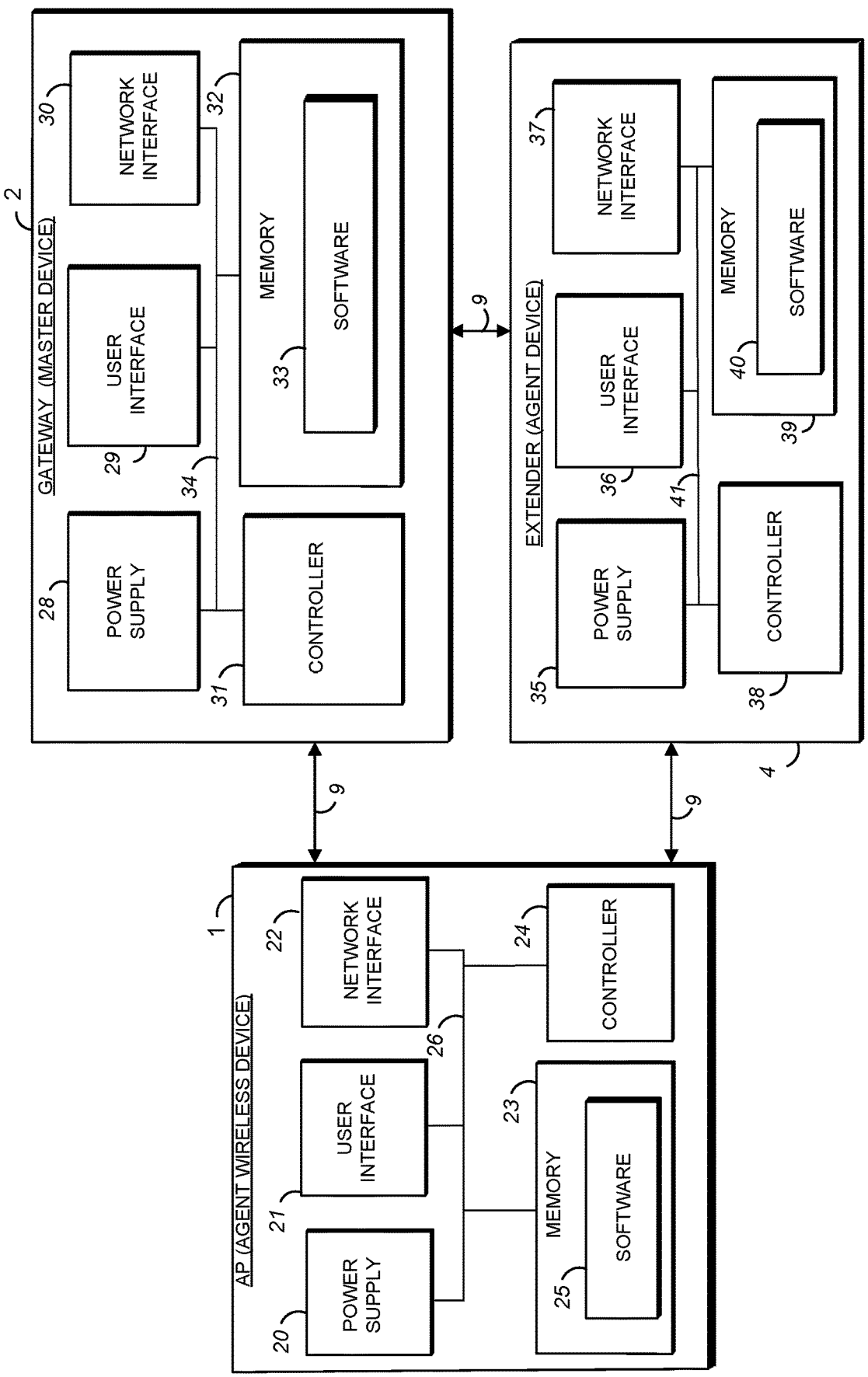
FIG. 2 illustrates a more detailed schematic diagram of an exemplary system for implementing smart control in a wireless network according to an embodiment of the present disclosure.

A detailed description of the exemplary internal components of the gateway device 2, the AP 1, the wireless extenders 4, and the wireless device 16 shown in FIG. 1 will be provided in the discussion of FIG. 2. However, in general, it is contemplated by the present disclosure that the gateway device 2, the AP 1, the wireless extenders 4, and the wireless device 16 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the gateway device 2, the AP 1, the wireless extenders 4, and the wireless device 16 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, the AP 1, the wireless extenders 4, and the wireless device 16 are further equipped with components to facilitate communication with other computing devices over the one or more network connections to local and wide area networks, wireless and wired networks, public and private networks, and any other communication network enabling communication in the system.

FIG. 2 illustrates a more detailed schematic diagram of an exemplary system for implementing smart control in a wireless network according to an embodiment of the present disclosure. FIG. 2 provides a more detailed description of the exemplary internal components of a master wireless device and agent wireless devices implemented in the wireless system. In the exemplary system of FIG. 2, is assumed that the gateway device 2 is the master device, and the AP 1 and the wireless extender 4 are the agent devices. However, it is contemplated by the present disclosure that the role of the master device can be held by any one of the gateway device 2, the AP 1, the wireless extender 4, and the wireless device 16. Similarly, the role of the agent device can be held by any one of the gateway device 2, the AP 1, the wireless extender, and the wireless device 16. Although FIG. 2 only shows one gateway device 2, one AP 1, and one wireless extender 4, it is contemplated by the present disclosure that there could be any number of gateway devices 2, APs 1, and wireless extenders 4 in the wireless network. However, there is only one active master device and the remaining wireless devices take the roles of agent devices. Additionally, it is contemplated by the present disclosure that that the cloud-based wireless device 16 has similar internal components to any one of gateway device 2, the AP 1, and the wireless extender 4 shown in FIG. 2.

Starting from left to right, the AP 1 includes a power supply 20, a user interface 21, a network interface 22, a memory 23, and a controller 24. The power supply 20 supplies power to the internal components of the AP 1 through the internal electrical bus 26. The power supply 20 includes a self-contained power source such as a battery pack with an interface to be powered through an electrical charger connected to an outlet (e.g., either directly or by way of another device). The power supply 20 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 21 includes, but is not limited to, push buttons, a keyboard, a keypad, a liquid crystal display (LCD), cathode ray tube (CRT), thin film transistor (TFT), light-emitting diode (LED), high definition (HD) or other similar display device including a display device having touch screen capabilities so as to allow interaction between a user and the AP 1.

The network interface 22 includes various network cards, interfaces, and circuitry implemented in software and/or hardware to enable communications between the AP 1, the gateway device 2 and the wireless extenders 4 using connection 9. The various network cards, interfaces, and circuitry enable communications via connection 9 using a wireless connection that operates in accordance with, but is not limited to, IEEE 802.11 protocol, RF4CE protocol, ZigBee protocol, or IEEE 802.15.4 protocol.

The memory 23 includes a single memory or one or more memories or memory locations that include, but are not limited to, a random access memory (RAM), dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), hard disk or any other various layers of memory hierarchy. The memory 23 can be used to store any type of data, instructions, software, algorithms, processes, or operations for controlling the general functions of the AP 1 and including software 25 for performing operations associated with smart control in the wireless network.

The controller 24 controls the general operations of the AP 1 and includes, but is not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the AP 1. Communication between the components (e.g., 20-24) of the AP 1 are established using the internal electrical bus 26.

The gateway device 2 includes a power supply 28, a user interface 29, a network interface 30, a controller 31, and a memory 32. The power supply 28 supplies power to the internal components of the gateway device 2 through the internal electrical bus 34. The power supply 28 includes a self-contained power source such as a battery pack with an interface to be powered through an electrical charger connected to an outlet (e.g., either directly or by way of another device). The power supply 28 can also include a rechargeable battery that can be detached allowing for replacement such as a NiCd, a NiMH, a Li-ion, or a Li-pol battery.

The user interface 29 includes, but is not limited to, push buttons, a keyboard, a keypad, LCD, CRT, TFT, LED, HD or other similar display device including a display device having touch screen capabilities so as to allow interaction between a user and gateway device 2. The network interface 30 includes various network cards, interfaces, and circuitry implemented in software and/or hardware to enable communications between the gateway device 2 and the AP 1 and the wireless extender 4 using connections 9. The various network cards, interfaces, and circuitry enable communications via connections 9 using a wireless connection that operates in accordance with, but is not limited to, IEEE 802.11 protocol, RF4CE protocol, ZigBee protocol, or IEEE 802.15.4 protocol. It is also contemplated by the present disclosure that various network cards, interfaces, and circuitry implemented in software and/or hardware of the network interface 30 enable communications between the gateway device 2 and a WAN, a LAN, a VPN, MANs, PANs, WLANs, SANs, PTSA, a global Telex network, or a 2G, 3G, 4G or 5G network.

The controller 31 controls the general operations of gateway device 2 and includes, but is not limited to, a CPU, a hardware microprocessor, a multi-core processor, a single core processor, an FPGA, a microcontroller, an ASIC, a DSP, or other similar processing device capable of executing any type of instructions, algorithms, or software for controlling the operation and performing the functions of the gateway device 2.

The memory 33 includes a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 32 can be used to store any type of data, instructions, software, algorithms, processes, or operations for controlling the general functions of the gateway device 2 and including software 33 for performing operations associated with smart control of in the wireless network. Communication between the components (e.g., 28-32) of the gateway device 2 are established using the internal electrical bus 34.

The wireless extender 4 includes a power supply 35, a user interface 36, a network interface 37, a controller 38, and a memory 39. The power supply 35 supplies power to the internal components of the wireless extender 4 through an internal electrical bus 41. The power supply 35 includes a self-contained power source such as a battery pack with an interface to be powered through an electrical charger connected to an outlet (e.g., either directly or by way of another device). The power supply 35 can also include a rechargeable battery that can be detached allowing for replacement such as a NiCd, a NiMH, a Li-ion, or a Li-pol battery.

The user interface 36 includes, but is not limited to, push buttons, a keyboard, a keypad, LCD, CRT, TFT, LED, HD or other similar display device including a display device having touch screen capabilities so as to allow interaction between a user and the wireless extender 4. The network interface 37 includes various network cards, interfaces, and circuitry implemented in software and/or hardware to enable communications between the wireless extender 4 and the AP 1 and between the wireless extender 4 and the gateway device 2 using connections 9. The various network cards, interfaces, and circuitry enable communications via connections 9 using a wireless connection that operates in accordance with, but is not limited to, IEEE 802.11 protocol, RF4CE protocol, ZigBee protocol, or IEEE 802.15.4 protocol.

The controller 38 controls the general operations of the wireless extender 4 and includes, but is not limited to, a CPU, a hardware microprocessor, a multi-core processor, a single core processor, an FPGA, a microcontroller, an ASIC, a DSP, or other similar processing device capable of executing any type of instructions, algorithms, or software for controlling the operation and performing the functions of the wireless extender 4.

The memory 39 includes a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 39 can be used to store any type of data, instructions, software, algorithms, processes, or operations for controlling the general functions of the wireless extender 4 and including software 40 for performing operations associated with smart control of in the wireless network. Communication between the components (e.g., 35-39) of the wireless extender 4 are established using the internal electrical bus 41.

Figure 3:
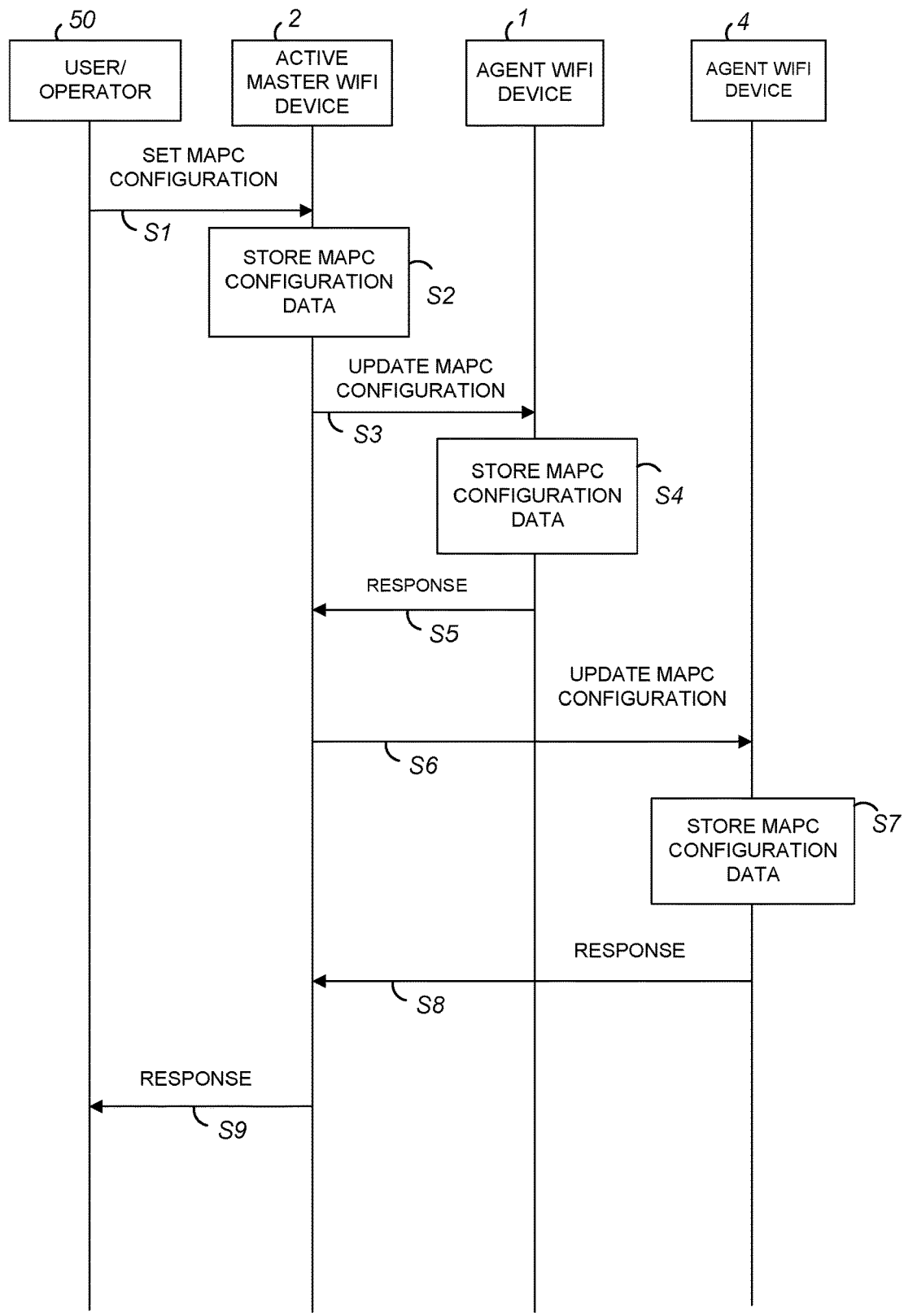
FIG. 3 illustrates a method for performing smart control in a wireless network according to an embodiment of the present disclosure.

FIG. 3 illustrates a method for performing smart control in a wireless network according to an embodiment of the present disclosure. In FIG. 3, the method illustrates operations between the gateway device 2, the AP 1, and the wireless extender 4 in performing smart control in the wireless network of FIG. 1

It is contemplated by the present disclosure that the wireless network implements MAP protocol (e.g., MAP network). It is assumed that the master device (e.g., MAP controller (MAPC) device) is the gateway device 2 and one or more MAP agent (MAPA) devices are the AP 1 and the wireless extenders 4.

In step S1, a user or operator 50 configures the gateway device 2 as the active master device (e.g., MAPC device) using various configuration parameters such as steering parameters, radio resource management (RRM) parameters, and basic service set (BSS) parameters. In step S2, the software 33 of the gateway device 2 stores the various configuration parameter as well as learned station (STA) information (e.g., band capability, steering friendly devices, etc.) in, for example, the memory 32, which is obtained from other wireless devices (e.g., APs 1 and wireless extenders 4) in the wireless network. The learned STA information is important for implementing steering algorithms and performing overall steering operations in the wireless network. The software 33 of the gateway device 2 uses the various configuration parameters to implement logic for controlling the fronthaul wireless devices (e.g., AP 1 and wireless extender 4) and the backhaul links in the wireless network. On the other hand, the AP 1 and the wireless extender 4 take the role of agent devices (e.g., MAPA devices) and use their respective software 25, 40 to implement logic to execute instructions and report measurements and networking capability data from the fronthaul wireless devices (e.g., APs and wireless extenders 4), clients, and backhaul links in the wireless network. In the wireless network, although there may be several MAPC capable devices (e.g., AP 1, gateway device 2, and wireless extenders 4), there is only one MAPC capable device that takes the role as the active MAPC device (i.e., master device). In FIG. 2, it is assumed that the master device is the gateway device 2. Once there is an active master device in the wireless network, the rest of the wireless devices serve agent devices (e.g., MAPAs).

In step S3, the software 33 of the gateway device 2 will report any updates in the configuration parameters and updates in any learned STA information to the AP 1. In step S4, the software 25 of the AP 1 will store the updates in the configuration parameters and updates in any learned STA information in the memory 23, and in step S5, the software 25 of the AP 1 will send a response message back to the gateway device 2 indicating that the updates in the configuration parameters and updates in any learned STA information have been stored. In step S6, the software 33 of the gateway device 2 will report the same updates in the configuration parameters and the updates in any learned STA information to the wireless extender 4.

In step S7, the software 40 of the wireless extender 4 will store the updates in the configuration parameters and updates in the learned STA information in the memory 39, and in step S8, the software 40 of the wireless extender 4 will send a response message back to the gateway device 2 that the updates in the configuration parameters and updates in the learned STA information have been stored. In step S9, the software 33 of the gateway device 2 will transmit a message back to the user or operator 50, once all the response messages are received from the AP 1 and the wireless extenders 4. The process in steps S2-S8 for transmitting of the updates in configuration parameters and the learned STA information by the master device 2 and storing of the updates by the agent devices 1, 4 is done periodically so that each of the agent devices 1, 4 is capable of using the configuration parameters and learned STA information to be set as a new master device when the current master device 1 becomes out of network. Out of network means that the active master MAPC device becomes damaged, disabled, powered down, removed from the network, or unable to perform its control functions in the wireless network.

Information and messaging between the gateway device 2, the AP 1, and the wireless extender 4 in the wireless network is accomplished using a proprietary message exchange using, for example, MAP, and high level design (HLD) type length values (TLVs) configuration data.

The following is sample message data for sharing information between the gateway device 2 (e.g., master device (MAPC)) and the AP 1 and the wireless extender 4 (e.g., agent device (MAPC)) in the wireless network the using MAP configuration data.

Sample MAP Configuration Data:
Steering Configuration Parameters

```
{
    "SteeringConfig": {
        "steeringTypeControl": 2,
        "triggerEventEnable": 27,
        "staLinkQualityMetric": 10,
        "trafficThreshold": 100,
        "targetSTASelectionDelay": 15,
        "forcedSteer": 0,
        "maxSteerFailureCount": 3,
        ...
        ...
    }
}
```

RRM Configuration Parameters

```
{
    "RRMConfig": {
        "NonOperableChannels": "",
        "ReEntryMode": 1,
        "ReEntryTime": "03:30",
        "ReEntryTrafficLimit": 1024
    }
}
```

BSS Configuration Parameters

```
{
    "BSS": [
        {
            "ssid": "ARRISFH_d8cb8ab547cd",
            "opclass": "8x",
            "authType": 32,
            "encType": 8,
```

-continued

```
        "extFlags": 32,
        "enabled": 1,
        "steerEnable": false,
        "priority": 0
    },
    ...
}
```

The following is sample message data for sharing information between the gateway device 2 (e.g., master device (MAPC)) and the AP 1 and wireless extender 4 (e.g., agent device (MAPC)) in the wireless network using HLD TLV configuration data.

| Field | Length | Value | Description |
| --- | --- | --- | --- |
| tlvType | 1 octet | 0xXX | MAP Configuration TLV |
| tlvLength | 2 | Variable | Number of octets in ensuing field |
| tlvValue | 1 octet | Variable | Steering TypeControl |
| | 1 octet | Variable | Steering TriggerEventEnable |
| | 1 octet | Variable | Steering StaLinkQualityMetric |
| | 1 octet | Variable | Steering TrafficThreshold |
| | 1 octet | Variable | Steering ForcedSteer |
| | 1 octet | Variable | Steering MaxSteerFailureCount |
| | x octets | Variable | Other Steering configurations |
| | 1 octet | Variable | RRM ReEntryMode |
| | 1 octet | Variable | RRM ReEntry Time Hour |
| | 1 octet | Variable | RRM ReEntry Time Minute |
| | 2 octets | Variable | RRM ReEntryTrafficLimit |
| | y octets | Variable | Other RRM configurations |
| | 1 octet | k | Num of BSS configuration |
| | 1 octet | n | SSID length |
| | n octet | Variable | SSID |
| | l octet | Variable | Operating Class |
| | 1 octet | Variable | AuthType |
| | z octets | Variable | Other BSS Configurations |
| | | | The above 5 fields are repeated k − 1 time. repeated |

The above description of smart control in the wireless network allows any MAPC capable device (e.g., AP 1 or wireless extender 4) to be set as the new active MAPC (e.g., master device) in the wireless network when there is an indication that the current active master MAPC device (e.g., gateway device 2) becomes out of network. That is, the wireless devices (e.g., gateway device 2, AP 1 and wireless extender 4) in the wireless network periodically transmit messages (e.g., as noted above) between each other. If there is an indication that the current active master MAPC device (e.g., gateway device 2) is missing messages, not responding to messages, or failing to transmit messages to the other MAPC capable devices (e.g., AP 1 or wireless extender 4) in the wireless network, it will be assumed that the current active master MAPC device (e.g., gateway device 2) is out of network.

Based on the messaging and data exchange (e.g., in the messages) between the MAPC capable devices (e.g., AP 1 or wireless extender 4) in the wireless network, one of the capable MAPC devices (e.g., AP 1 or wireless extender 4) will be set as the new active master MAPC device. That is, messaging and data exchange (e.g., in the messages) between the MAPC capable devices (e.g., AP 1 or wireless extender 4), gives each wireless device in the wireless network information regarding the capability of a wireless device to take on the role of the active master MAPC device. This smart control of the wireless network allows for the seamless control over the wireless network while avoiding manual configuration operations having to be performed by a user or operator 50.

Figure 4:
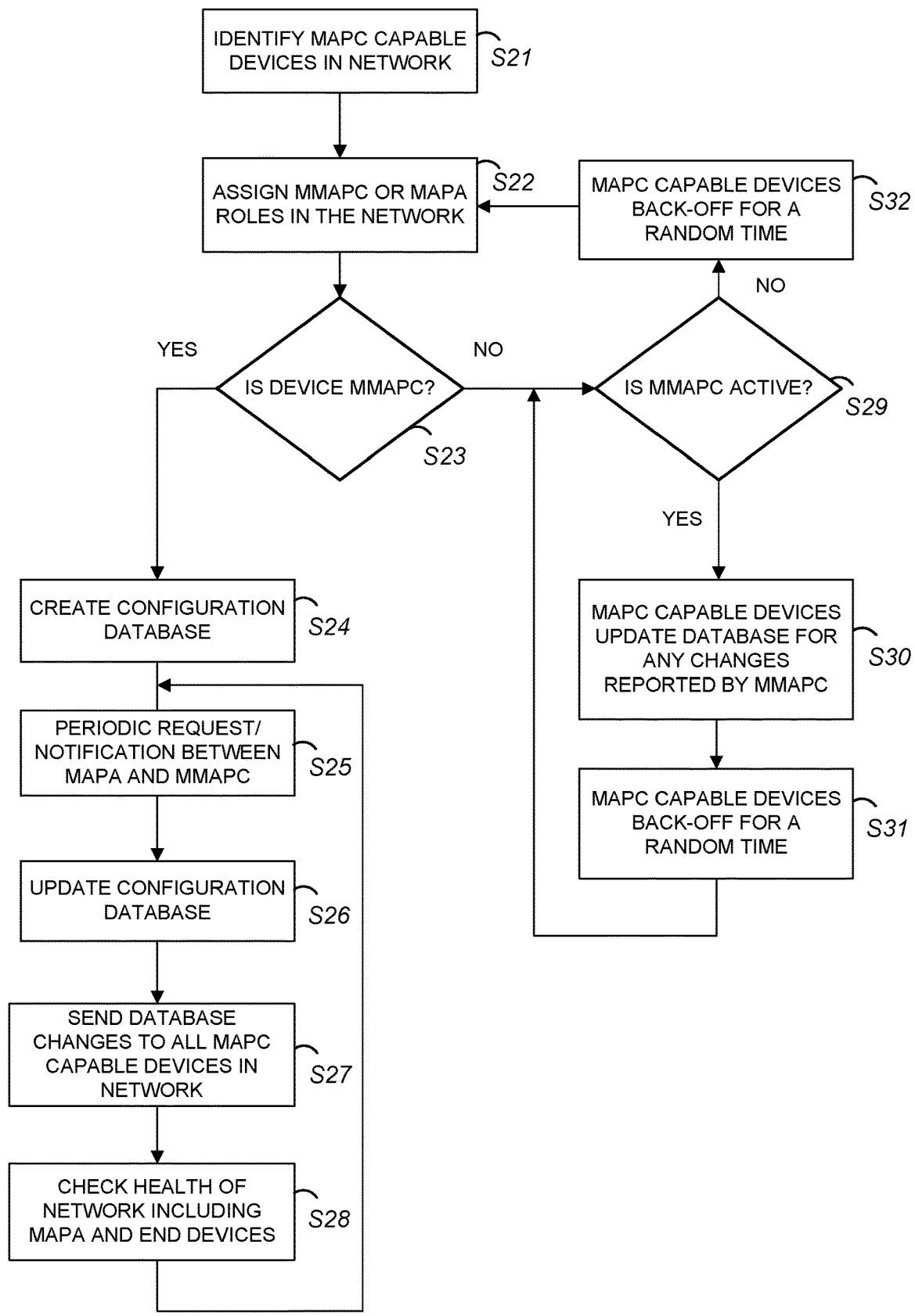
FIG. 4 illustrates a method for performing management of the smart control devices in a wireless network according to an embodiment of the present disclosure.

FIG. 4 illustrates a method for performing management of the smart control devices in a wireless network according to an embodiment of the present disclosure. In FIG. 4, it is assumed that the wireless devices (e.g., gateway device 2, AP 1, and wireless extender 4) in the wireless network periodically transmit messages (e.g., as noted above) between each other. For example, the messages are transmitted between all wireless devices in the wireless network periodically and upon start-up of each of the wireless devices. The messaging and data exchange (e.g., in the messages) between the wireless devices (e.g., gateway device 2, AP 1, and wireless extender 4) gives each wireless device in the wireless network information regarding the capability of a wireless device such that the roles of each of the devices (e.g., master device MAPC or MMAPC device; or MAPA or MAPC capable agent device) can be identified.

In step S21, based on the messaging and data exchange (e.g., in the messages) between the wireless devices (e.g., gateway device 2, AP 1, and wireless extender 4) in the wireless network, the roles of each of the wireless devices are identified and, in step S22, the identified roles are assigned (e.g., master device MAPC or MMAPC device; or MAPA or MAPC capable agent device). Once the roles are assigned to the wireless devices (e.g., gateway device 2, AP 1, and wireless extender 4) in the wireless network, activities associated with each of the roles are performed. For example, in step S23, if is determined that a wireless device is assigned the role as the MMAPC device (e.g., gateway device 2), in step S24, the MMAPC device (e.g., software 33 of the gateway device 2) will create a configuration database such as database 7. The database 7 can be used to store various network information, wireless device information, configuration parameters, and learned station (STA) information. The database 7 can be located in the wireless network or in a separate network connected to the wireless network such as a WAN, LAN, VPN, MANs, PANs, WLANs, SANs, a PTSA, a global Telex network, or a 2G, 3G, 4G or 5G network. Although the database 7 is shown in FIG. 1 as a separate device, the database 7 could be one or more memories or memory locations in any one of the wireless devices such as the gateway device 2, the AP 1, or the wireless extender 4 in the wireless network.

In step S25, the MMAPC device (e.g., software 33 of the gateway device 2) transmits a request or notification for performing messaging between all the wireless devices in the wireless network (e.g., gateway device 2, AP 1 and wireless extender 4). In step S26, the MMAPC device (e.g., software 33 of the gateway device 2) will perform updates to the database. The updates may include, but are not limited to, various network configuration information, wireless device configuration information, and learned station (STA) information. In step S27, the updates in the database are transmitted from the MMAPC device (e.g., software 33 of the gateway device 2) to the other MAPA or MAPC capable agent devices (e.g., AP 1 and wireless extender 4) in the wireless network. In step S28, the MMAPC device (e.g., software 33 of the gateway device 2), periodically checks the health of the wireless network and health of the MAPA or MAPC capable agent devices (e.g., AP 1 and wireless extender 4) in the wireless network. The health of the wireless network and the health of the MAPA or MAPC capable agent devices (e.g., AP 1 and wireless extender 4) in the wireless network may be based on, for example, the request or notification for performing messaging between all the wireless devices in the wireless network (e.g., gateway device 2, AP 1 and wireless extender 4), as in step S25. Additionally, it is contemplated by the present disclosure that steps S25-S28 are repeated periodically by the MMAPC device (e.g., software 33 of the gateway device 2) in the performing of management of the smart control devices in a wireless network.

In step S23, if it is determined that the assigned device is not the MMAPC device (e.g., the gateway device 2), then it is assumed to be an assigned MAPA or MAPC capable agent device (e.g., AP 1 and wireless extender 4), and in step 29, it is determined if the MMAPC device (e.g., the gateway device 2) is active in the wireless network. The activity of the MMAPC device may be based, for example, on the request or notification for performing messaging between all the wireless devices in the wireless network (e.g., gateway device 2, AP 1 and wireless extender 4 (e.g., as in step S25). If it is determined that the MMAPC device (e.g., gateway device 2) is active, then in step S30, the MAPA or MAPC capable agent devices (e.g., AP 1 and wireless extender 4) will update their own databases or memories to reflect the updates in the database reported by the MMAPC device (e.g., gateway device 2).

The wireless devices (e.g., gateway device 2, AP 1, and wireless extender 4) periodically transmit messages in the wireless network (e.g., as noted above) between each other, and there can be interference or conflicts in the messaging being performed. In step S31, each of the MAPA or MAPC capable agent devices (e.g., AP 1 and wireless extender 4) will perform back-off operations for a random time period (e.g., a fraction of a second) to avoid interference or conflicts in the messaging. If there are still interferences or conflicts after performing the back-off operation for the first time, then the back-off operations will be repeated. After the back-off operation (e.g., a fraction of a second), the MAPA or MAPC capable agent devices (e.g., AP 1 and wireless extender 4) will repeat the operations in steps S29-S30. In step S29, if it is determined that the assigned MMAPC device (e.g., gateway device 2) is not active, then in step S32, each of the MAPA or MAPC capable agent devices (e.g., AP 1 and wireless extender 4) will perform a back-off operation for a random time (e.g., a fraction of a second), and then perform operations for assigning the roles to each of the wireless devices, as in step S22. However, if there is interference or conflicts after performing the back-off operation the first time, then the back-off operation will be repeated.

Based on the messaging and data exchange (e.g., in the messages) between the MAPC capable devices (e.g., AP 1 or wireless extender 4) in the wireless network, one of the capable MAPC devices (e.g., AP 1 or wireless extender 4) will be set as the new active master MAPC device. That is, messaging and data exchange (e.g., in the messages) between the MAPC capable devices (e.g., AP 1 or wireless extender 4), gives each wireless device in the wireless network information regarding the capability of a wireless device to take on the role of the active master MAPC device. This smart control of the wireless network allows for the seamless control over the wireless network while avoiding manual configuration operations having to be performed by a user or operator 50.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIGS. 3 and 4. For example, the one or more memories stores software or algorithms with executable instructions and the one or more processors can execute a set of instructions of the software or algorithms in association with performing smart control in a wireless network according to the embodiments of the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

We claim:

1. A method for implementing smart control in a network comprising:
   setting a wireless device in the network as an active master device for controlling all other wireless devices and backhaul links in the network;
   storing, using the active master device, configuration parameters and learned station (STA) information for the network;
   receiving, using the active master device, information regarding updates in the configuration parameters and learned STA information from any of the other wireless devices; and
   periodically transmitting from the active master device the updates to the configuration parameters and the learned STA information to all of the other wireless devices in the network,
   wherein, when there is an indication that the active master device becomes out of network, any one of the other wireless devices uses the updates to the configuration parameters and the learned STA information to be set as a new active master device in the network.

2. The method according to claim 1, further comprising transmitting, from each of the other wireless devices, a response to the active master device that the updates to the configuration parameters and the learned network information have been received and stored.

3. The method according to claim 1, further comprising:
   using the active master device,
      creating a configuration database in a memory;
      periodically transmitting a request for a message or a notification exchange with the other wireless devices in the network;
      performing updates to the configuration database;
      transmitting database changes and updates to the other wireless devices in the network, wherein the other wireless devices in the network store the database changes and updates in respective memories.

4. The method according to claim 1, further comprising:
   transmitting periodically messages between the plurality of wireless devices, and
   determining the new active master device based on the messages received between the plurality of wireless devices or based on messages being missed or not sent by the active master device,
   wherein the messages include information regarding capability of each of the plurality of wireless devices to be the new active master device.

5. The method according to claim 1, wherein
   the network is a wireless mesh network,
   the active master device is a mesh access point (MAP) control device, and
   the other wireless devices are MAP agent devices.

6. The method according to claim 1, wherein the wireless device set as the active master device is a cloud-based device.

7. A non-transitory computer-readable recording medium for implementing smart control in a network, the non-transitory computer-readable recording medium storing one or more programs which when executed by a hardware processor perform steps comprising:
   setting a wireless device in the network as an active master device for controlling all other wireless devices and backhaul links in the network;
   storing, using the active master device, configuration parameters and learned station (STA) information for the network;
   receiving, using the active master device, information regarding updates in the configuration parameters and learned STA information from any of the other wireless devices; and
   periodically transmitting from the active master device the updates to the configuration parameters and the learned STA information to all of the other wireless devices in the network,
   wherein, when there is an indication that the active master device becomes out of network, any one of the other wireless devices uses the updates to the configuration parameters and the learned STA information to be set as a new active master device in the network.

8. The non-transitory computer-readable recording medium according to claim 7, further comprising
   transmitting, from each of the other wireless devices, a response to the active master device that the updates to the configuration parameters and the learned network information have been received and stored.

9. The non-transitory computer-readable recording medium according to claim 7, further comprising:
   using the active master device,
   creating a configuration database in a memory;
   periodically transmitting a request for a message or a notification exchange with the other wireless devices in the network;
   performing updates to the configuration database; and
   transmitting database changes and updates to the other wireless devices in the network, wherein the other wireless devices in the network store the database changes and updates in respective memories.

10. The non-transitory computer-readable recording medium according to claim 7, further comprising:
    transmitting periodically messages between the plurality of wireless devices, and
    determining the new active master device based on the messages received between the plurality of wireless devices or based on messages being missed or not sent by the active master device,
    wherein the messages include information regarding capability of each of the plurality of wireless devices to be the new active master device.

11. A system for implementing smart control in a network comprising:
    a plurality of wireless devices, each including,
    a user interface;
    at least one hardware processor;
    a non-transitory memory storing a program; and
    a network interface configured to establish connections in the network,
    wherein each of the plurality of wireless devices executes their respective programs using their respective hardware processors to perform the following:
    set, using the user interface of one wireless device, the one wireless device as an active master device in the network for controlling the other wireless devices and backhaul links in the network;

store in the non-transitory memory of the active master device, the configuration parameters and learned station (STA) information for the network;

receive, using the network interface of the active master device, updates in the configuration parameters and learned STA information from any of the other wireless devices; and periodically transmit using the network interface of the active master device, the updates to the configuration parameters and the learned STA information to all of the other wireless devices in the network, wherein, when there is an indication that the active master device becomes out of network any one of the other wireless devices in the network uses the updates to the configuration parameters and the learned STA information to be set a new active master device in the network.

12. The system according to claim 11, wherein
the network is a mesh network,
the active master device is a mesh access point (MAP) control device, and
the other wireless devices are MAP agent devices.

13. The system according to claim 11, wherein configuration parameters include radio resource management (RRM) configuration data and basic service set (BSS) configuration data.

14. The system according to claim 11, wherein the learned STA information includes band capacity and band steering information.

15. The system according to claim 11, wherein the wireless device set as the master device is a cloud-based device.

16. The system according to claim 15, wherein each of the plurality of wireless devices includes any one of a wireless access point, a wireless gateway, and a wireless extender.

17. A smart control apparatus in a network comprising:
a user interface;
at least one hardware processor;
a non-transitory memory storing a program; and
a network interface configured to establish connections in network, wherein the at least one hardware processor executes the program to perform the following:
set, through the user interface, the smart control apparatus as an active master device in the network for controlling other wireless devices in the network and backhaul links in the network;
store, in the non-transitory memory, the configuration parameters and learned station (STA) information for the network;
receive, through the network interface, information regarding updates in the configuration parameters and learned STA information from any of the other wireless devices; and
periodically transmit, using the network interface, the updates to the configuration parameters and the learned STA information to all of the other wireless devices in the network,
wherein, when there is an indication that the active master device becomes out of network, any one of the other wireless devices in the network uses the updates to the configuration parameters and the learned STA information to be set as a new active master device in the network.

18. The smart control apparatus of claim 17, wherein the smart control apparatus set as the master device is a cloud-based device.

19. A smart control apparatus in a network comprising:
a user interface;
at least one hardware processor;
a non-transitory memory storing a program; and
a network interface configured to establish connections in network,
wherein the at least one hardware processor executes the program to perform the following:
obtain periodically, through the network interface, configuration parameters and learned station (STA) from an active master device in the network, the active master device controlling other wireless devices in the network and backhaul links in the network;
store, in the non-transitory memory, the configuration parameters and learned station (STA) information; and
when there is an indication that the active master device becomes out of network, set, using the at least one hardware processor, the smart control apparatus as a new active master device using the configuration parameters and learned station (STA) information.

20. The smart control apparatus of claim 19, wherein the smart control apparatus set as the master device is a cloud-based device.

* * * * *